2,946,759

HEAT-REACTIVE COMPOSITIONS COMPRISING A POLYAMIDE AND TRIMETHYLPHENOL

Melvin M. Gallant, Metuchen, and Norris R. Legue, South Orange, N.J., assignors to Union Carbide Corporation, a corporation of New York No Drawing. Filed June 23, 1958, Ser. No. 743,979

11 Claims. (Cl. 260—19)

This invention relates to heat-reactive compositions and, more particularly, to heat-reactive trimethylolphenol polyaminoamide compositions.

Heat-active, or curable resin compositions are widely used as adhesives for laminating sheets of material and for coating a variety of surfaces. Heretofore, heat-reactive, non-oil soluble, phenolic resin baking solutions which are curable to infusible, insoluble, practically glass-hard, chemically resistant coatings have been the best available materials for certain coating applications, particularly metal coating applications, such as the interiors of railroad tank cars. Non-oil soluble phenolic resin coatings, however, are rather inflexible and have a tendency to crack and chip under stress. In this respect, oleoresinous coatings which comprise an oil-soluble phenolic resin and a drying oil are superior, but they do not provide a chemically resistant coating. Attempts have been made to plasticize the phenolic resin coating compositions in order to achieve a coating which is both flexible and chemically resistant. It has been found, however, that, the addition of plasticizers although resulting in improved flexibility generally causes a decreased resistance to solvents. The presence of plasticizer additives also lengthens the cure time necessary to convert the phenolic resin to an insoluble, chemically resistant coating. Extended cure times are uneconomical and hence undesirable.

It is an object, therefore, of our invention to provide a heat-reactive composition which is simultaneously flexible, impervious to chemicals and solvents, and adheres tenaciously to the surface with which it is in contact.

It is another object of our invention to provide heat-reactive compositions which cure rapidly to the infusible state at low temperatures.

These and other objects are accomplished in accordance with the present invention by forming a homogeneous mixture of trimethylolphenol and a polyaminoamide.

The combination of advantageous properties found in our polyaminoamide-trimethylolphenol compositions can not be attained with trimethylolphenol itself, or a polyaminoamide itself. Even mixtures of trimethylolphenol and polyamines, or mixtures of a polyaminoamide and a phenolic resin, such as a water-soluble phenol-formaldehyde resole resin do not result in the tenaciously adhering, flexible and impervious coating secured with the compositions of this invention.

While not desiring to be bound by a particular theory, it is believed that the superiority of our compositions is due to the absence of reactive ring hydrogens on the trimethylolphenol. Reactive ring hydrogens are normally present in the positions ortho and para to the phenolic hydroxyl group in conventional phenolic resins. In trimethylolphenol, however, these positions are occupied by methylol groups. Methylol groups present in the reaction system, on the trimethylolphenol or on the resole, will react with either (A) a reactive ring hydrogen, if any are available, or (B) another methylol group, or (C) some other reactive group e.g. a primary or secondary amino group. Reaction A proceeds much more rapidly than B or C, and while there are reactive ring hydrogens available, the methylol reacts almost exclusively therewith. The molecules in the system are immobilized because of the development of cross-linkages. The retarded movement of both the methylol groups and the other reactive groups greatly inhibits reaction. In a polyaminoamide/conventional phenolic resin system, the amino groups do not react to any appreciable extent with the methylol groups until the reactive ring hydrogens on the phenol are substantially exhausted; and cross-linking causes a retardation of molecule mobility. Consequently, the polyaminoamide molecules are, in all probability, merely mechanically mixed in an unreacted state within the resin system.

In a trimethylolphenol-polyaminoamide system, however, there are no reactive ring hydrogens present and the primary and secondary amino groups are able to compete successfully for methylol groups aginst the methylol autocondensation reaction, and the trimethylolphenol and polyaminoamide are chemically interracted with one another. It is possible that this extensive chemical interreaction is responsible for the many outstanding properties, hereinafter more fully set forth, of the compositions of our invention.

The trimethylolphenol, 2,4,6-tris(hydroxymethyl) phenol, component of our heat-reactive compositions is a white, crystalline compound having a melting point of about 84–85° C. and can be represented structurally as:

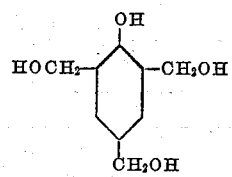

The solid form of this compound is satisfactory for use in our invention, but we prefer to use trimethylolphenol as an aqueous solution. A 70% aqueous solution of trimethylolphenol such as sold by the Bakelite Company under the trade designation, BRL–1030, is quite satisfactory.

Trimethylolphenol is readily soluble in water, low molecular weight alcohols, and phenols, sparingly soluble in low molecular weight ketones, esters, nitromethane, and similar polar solvents. It is substantially insoluble in hydrocarbons, halogenated hydrocarbons and similar non-polar solvents. An aqueous solution of the compound can be freely diluted with water soluble polar solvents, such as methanol, ethanol, isopropanol, acetone and the like.

The polyaminoamides useful in the present invention are generally prepared as disclosed in U.S. Patents 2,379,413 and 2,450,940 to Bradley and Cowan et al., respectively. These polyaminoamides are the resinous products of the reaction of a primary or secondary polyamine with high molecular weight saturated or unsaturated carboxylic acids or esters.

Polyamines which are suitable for preparing the polyaminoamides for the compositions of our invention include aliphatic and aromatic primary and secondary amines containing at least two amino groups, such as ethylene diamine, diethylene triamine, triethylene tetramine, hexamethylene diamine, tetraethylene pentamine, piperazine, p-xylene diamine, the diamines obtained from hydrogenation of the fatty acid nitriles, and the like. Substituted di- or tri-amines can also be used. Alkylolamines, for example, are especially suitable for preparing the polyaminoamides useful in the present invention. It is to be noted that the addition of one of the above polyamines to an aqueous trimethylolphenol solution without first changing it to a polyaminoamide results in almost immediate precipitation of an unusable gel.

The high molecular weight saturated or unsaturated polymeric fat acids to be reacted with the polyamines to form the polyaminoamides useful in the present invention are obtained by dimerizing or polymerizing polyene fat acids or esters thereof, such as are obtained from tung oil, linseed oil, perilla oil, and other drying oils. Particularly suitable polyene fat acids and esters are those having between about 16 and 22 carbon atoms, and preferred are those having 18 carbon atoms, for example, octadecadienoic and octadecatrienoic acids and esters. The lower alkyl esters are preferred, particularly the methyl and ethyl esters. The high molecular weight polymeric acids can be hydrogenated to produce saturated compounds, if desired.

The polyaminoamides employed in our invention having an "amine number" above about 80 generally are characterized by slower curing rates and can be advantageously used as primer coatings. Those having an "amine number" above 200 cure quite rapidly to flexible, tenaciously adhering coatings. The polyaminoamides useful in our invention are soluble in low molecular weight aliphatic alcohols, e.g. methanol, ethanol, isopropanol and the like, or water or in a solvent miscible with at least one of the solvents aforementioned or water. The amine number is the number of milligrams of KOH equivalent to the amine alkalinity present in one gram of sample as determined by titration of the sample with HCl to a bromcresol green end-point. Particularly suitable as the polyaminoamides are those made from polyamines and the 9,12-linoleic acid dimer, such as are sold by General Mills under the trade-name "Versamid." Typical properties of these are shown below.

TABLE I

| Property | Polyaminoamide | | |
| --- | --- | --- | --- |
| | "Versamid 100" | "Versamid 115" | "Versamid 125" |
| Viscosity (Brookfield) poises: | | | |
| at 25° C | semi-solid | | 450–550. |
| at 40° C | | 500–750 | 80–120. |
| Color (Gardner) | 12 max | 12 max | 12 max. |
| Amine Number | 83–93 | 210–230 | 290–320. |
| Specific Gravity at 25° C | 0.98 | 0.99 | 0.97. |

The optimum polyaminoamide-trimethylolphenol ratio in the composition of our invention is in some degree dependent upon the particular polyaminoamide used and the combination of properties desired. In general, an increase in the proportion of polyaminoamide employed increases the flexibility of the product; increased proportions of trimethylolphenol, on the other hand, give increased rates of cure and increased solvent resistance. The use of as little as 2% by weight of polyaminoamide in our compositions is beneficial. For example, a composition containing 2 parts of a polyaminoamide and 98 parts by weight of trimethylolphenol can substantially decrease the eyeing or cratering tendency exhibited by dip-coatings of trimethylolphenol alone. The optimum combination of curing speed, coating flexibility and solvent resistance generally requires a higher polyaminoamide to trimethylolphenol weight ratio, i.e. from 10 parts of the former to 90 parts of the latter to about 60 parts of the former to about 40 parts of the latter by weight. Increases in the ratio beyond 60 parts by weight of polyaminoamide per 40 parts by weight of the trimethylolphenol progressively reduce solvent resistance, increase required curing times, and have proven uneconomical generally.

For convenience in use, we prefer to form a homogeneous solution of the trimethylolphenol and polyaminoamide by dissolving them either jointly in a mutual solvent or separately in two or more miscible solvents, e.g., a mono- or poly-hydric alcohol, such as, ethanol, isopropanol "Cellosolve" and similar alkyl, alkoxyalkyl and alkoxyalkoxyalkyl alcohols. Other solvents such as dimethylformamide and the like are also suitable. We particularly prefer to employ a low-boiling alcohol, e.g., ethanol, where short cure times are to be used, because the higher boiling solvents, such as "Cellosolve" sometimes remain in the film unless a long cure time is employed. The particular solvent or combinations of solvents used will depend upon the end use of the composition. For example, a highly satisfactory spray diluent is a 65:10:20:5 isopropanol:xylene:methyl Cellosolve: Carbitol mixture. The solvent-polyaminoamide-trimethylolphenol mixture can be "bodied" or increased in viscosity, if desired, by heating at a moderate temperature, about 40–50° C., for a short period where the composition is to be used as a spray coating. Increased viscosity normally results in a reduced tendency in the sprayed coating to "crater" and "crawl" and show other surface imperfections.

A polyaminoamide which is soluble in trimethylolphenol and which does not react too quickly therewith at room temperatures, such as "Versamid 125" for example, can be satisfactorily mixed therewith without addition of another solvent. This directly combined composition is particularly adapted for wood bonding, and other laminating and adhesive applications.

Most coating applications contain from 20 to about 65 parts by weight of solids per 100 parts by weight of the coating composition. Such mixtures can conveniently be dip-coated or sprayed onto the surface to be covered and can be applied with other conventional coating techniques. Greater than 65% solids in our compositions generally results in a highly viscous solution which is difficult to work with, particularly in automatic equipment. On the other hand, less than about 20% solids generally gives an uneconomical mixture which is often too fluid to be sprayed onto a surface satisfactorily. Compositions containing less than 20% solids are useful in some dip-coating applications, and as a paper additive and in miscellaneous bonding applications, such as insulation batt bonding.

Modifiers such as pigments, thickening agents, gel depressants, stabilizers, surfactants, antioxidants and the like can be incorporated and dispersed in the composition, suitably by mixing in a ball mill or paint mill and the like. During such mixing operations, care should be taken that the mass temperature does not rise to the point at which excessive resinification and gelation may occur.

The compositions of our invention are rapidly curable over a range of temperatures. Factors to be considered in determining optimum time and temperature for curing include: the polyaminoamide/trimethylolphenol ratio; nature and amount of solvents and modifiers employed; thickness of coating desired; and properties desired in the coating. Generally speaking, we have found cure times of from about 4 to 15 minutes at a temperature of 275° to 300° F. yield the best results with our compositions. An increase of the proportion of the trimethylolphenol results in a more rapidly curable composition. For example, a 50:50 mixture of trimethylolphenol and "Versamid 125" can be cured in about 15 minutes at a temperature of 300° F. An 80:20 mixture of the same components can be cured in 5 minutes, one-third of the time, at the same temperature, 300° F. Longer cure times at lower temperatures are possible but not economically attractive.

Due to their exceptionally fast curing characteristics, the compositions of our invention, particularly those having a high trimethylolphenol/polyaminoamide ratio, are especially adaptable to coating procedures employing continuous curing techniques wherein the coating is heated for only a brief interval. In these circumstances, it is possible to cure the compositions at temperatures up to 400–450° F. advantageously.

The following examples are illustrative.

Example 1

The following

| | Gms. |
|---|---|
| 70% trimethylolphenol (Bakelite Co.'s BRL–1030) | 200 |
| Polyaminoamide (General Mills' "Versamid 125") | 140 |
| Solvent: | |
| (a) Monoethyl ether of diethylene glycol | 10 |
| (b) Isopropanol | 80 |
| (c) Ethanol | 90 |
| Thickening agent: (Baker Castor Oil Company's "MPA") | 1.5 |
| Pigment: | |
| (a) Du Pont's "Ramapo Green 510D" | 45 |
| (b) Titanium dioxide | 45 | were placed in a ball mill and milled for 72 hours. The resulting mixture was homogeneous and had a Brookfield viscosity of 589 centipoises at 70° F. After dilution with 1:4:10 Cellosolve:ethanol:isopropanol mixture to give a viscosity of "A" on the Gardner scale, the mixture was sprayed onto steel panels. The panels, 2.5" by 5" sections of 15 mil cold-rolled steel, had been previously washed with toluene to insure a grease-free surface. The spray coated panels, after air drying for 15 minutes at room temperature, were baked in a 300° F. oven for an additional 15 minutes. The cured coatings, about 2.5 mils thick were uniform over the panels and had good gloss.

In order to test the toughness, adhering strength and flexibility of the coatings, each coated panel was bent back upon itself. The coated surface was examined while the panels were so bent. Each coating completely adhered to the metal substrate and exhibited no cracks, crazing or other surface imperfections. The coatings were also acetone resistant as shown by spot tests with acetone failing to discernibly soften them.

Example 2

Two compositions A and B were prepared by mixing the components listed below at room temperature to form a clear, homogeneous solution. 2.5" by 5" panels of 15 mil thick, cold rolled steel, having previously been cleaned with toluene, were immersed in this solution and withdrawn at a constant rate. The panels were air dried for 15 minutes and then baked for an additional 15 minutes in a 300° F. oven.

The components and properties of the novel composition of this invention, A, and a prior art water soluble resole coating composition, B, are given in Table II following.

TABLE II

[All parts by weight]

| | Parts | |
|---|---|---|
| Composition | A | B |
| 70% Trimethylolphenol (Bakelite Co.'s BRL–1030) | 42.8 | |
| Resole Resin [1] | | 42.8 |
| Polyaminoamide (General Mills' "Versamid 125") | 30 | 30. |
| Cellosolve | 127.2 | 127.2 |
| Properties: | | |
| Acetone Immersion @ 25° C | 336 hrs [2] | 336 hrs [2] |
| Boiling Water Immersion | 24 hrs [2] | 40 min. |

[1] Resin made by reacting 1 part phenol with 2 parts 37% aqueous formalin in the presence of a catalytic quantity of NaOH for about 1.75 hrs. at 70° C.; neutralizing the reaction mixture with HCl to about pH 7.5; vacuum dehydrating @ 50 mm. Hg pressure and @ 40–50° C. to resinous solids content of 70%.
[2] Test discontinued.

The compositions A and B were also tested for impact resistance. Panels were coated with the compositions in thicknesses as shown below and tested by permitting a measured weight to fall from a measured height upon the back of the coated panel. Tests were given at 40, 60 and 100 inch-pounds of impact. The results were as follows:

IMPACT RESISTANCE

| Composition | Thickness, mils | Inch-Pounds of Impact | | |
|---|---|---|---|---|
| | | 40 | 60 | 100 |
| A | 0.76 | | pass | cracked slightly |
| B | 0.70 | pass | turned powdery | |

As can be seen from Table II the trimethylolphenol-polyaminoamide coating composition of this invention greatly exceeded the prior art resole/polyaminoamide coating both in resistance to boiling water and impact resistance.

It is noteworthy that 60 inch-pounds of impact caused the resole coatings to powder away from the panels; whereas the trimethylolphenol coating was unaffected by 60 inch-pounds of impact and only slightly cracked at 100 inch-pounds of impact, and remained fully and firmly adhered to the metal substrate. It should be remembered that, all other things being equal, a thicker coating normally exhibits a lower impact resistance. The trimethylolphenol/polyaminoamide coating, however, although thicker than the resole/polyaminoamide coating, was far superior in impact resistance.

The test results are indicative of the prior art coatings excessive brittleness, lack of toughness, poor adhesive and cohesive strength in comparison with the trimethylolphenol/polyaminoamide coatings.

Example 3

Four compositons A, B, C and D were prepared. The components of each composition and the cure times used, together with results of test applied, are given in Table III below, wherein all parts are by weight unless otherwise specified.

TABLE III

| | Parts by Weight | | | | |
|---|---|---|---|---|---|
| Composition | A | B | C | D | E |
| Trimethylolphenol (TMP) 70% aq. soln | 85.7 | 85.7 | 114.3 | | |
| Resole resin: | | | | | |
| A [2] | | | | 74 | |
| B [3] | | | | | 50 |
| Polyaminoamide (PAA) (General Mills' "Versamid 125") | 40 | 40 | 20 | | 50 |
| TMP/PAA Ratio | 60/40 | 60/40 | 80/20 | | |
| Solids Content (Percent) | 50 | 50 | 50 | 40 | |
| Cellosolve | 74.3 | 74.3 | | | |
| Ethanol | | | 65.7 | 26 | |
| Cure: | | | | | |
| Time (min.) | 15 | 15 | 5 | 20 | 15 |
| Temp. (° F.) | 275 | 300 | 300 | 350 | 400 |
| Properties: | | | | | |
| Methanol Immersion (hrs. to failure at room temp.) | | 264 | [1] 336 | [1] 336 | 24 |
| Acetone Immersion (hrs. to failure at room temp.) | 120 | [1] 384 | [1] 336 | [1] 336 | 168 |

[1] Test discontinued.
[2] An ethanolic, phenol-formaldehyde resole coating solution having a viscosity at 25° C., of 700–1000 centipoises and a specific gravity of 1.045–1.056. Resinous solids content was 54% by weight.
[3] An ethanolic cresylic resole coating solution containing 55% of the resole. It has a viscosity of 400–600 centipoises, at 25° C., a specific gravity of 1.021–1.029 and a set time of 700–1150 seconds at 135° C.

IMPACT RESISTANCE

| Composition | Thickness (mils) | Inch-Pounds of Impact | | | | | |
|---|---|---|---|---|---|---|---|
| | | 10 | 20 | 40 | 60 | 70 | 100 |
| A | 0.47 | | | | | | pass |
| B | 0.83 | | | fail | | | |
| C | 0.65 | | pass | | | | |
| D | 0.4 | fail | | | | | |
| E | 0.5 | | | | pass | fail | |

The compositions of our invention are A, B and C. Composition D is typical of the largest volume selling commercial phenolic resin baking coating solutions, Composition E is typical of the best phenolic resin and polyaminoamide compositions.

A comparison of the methanol immersion resistances of B, C and E points out that even higher curing temperatures do not overcome the characteristic susceptibility of polyaminoamide resins to methanol attack where they are used with a phenolic resin. Combining the polyaminoamide with trimethylolphenol, however, confers a substantial improvement in methanol resistance so that even in this respect polyaminoamide containing compositions can equal the best available phenol-formaldehyde resins. (cf. C and D) The polyaminoamide/phenolic resin composition E was also poorer in comparison with the polyaminoamide/trimethylolphenol compositions in acetone resistance, flexibility and impact resistance even with increased cure temperatures.

A comparison of A and B illustrates the increase in solvent resistance and the decrease in impact resistance with use of increased cure temperatures. Composition D exhibited good solvent resistance but, although a considerably thinner coating e.g. 0.4 mil in D vs. 0.65 mil in C, a much poorer impact resistance than the polyaminoamide/trimethylolphenol compositions. Composition E exhibited a solvent resistance greatly inferior to B, C and D. The resole compositions D and E required too, a longer curing time and/or higher curing temperatures. Impact resistance of the polyaminoamide/trimethylolphenol compositions is decreased by an increase in the TMP/PAA ratio (cf. B and C), and also by an increase in the curing temperatures employed (cf. A and B.)

*Example 4*

Two compositions were prepared:

[All parts by weight.]

| Composition | A | B |
|---|---|---|
| Trimethylolphenol (TMP) 70% aq. soln | 100 | 114.3 |
| Polyaminoamide (PAA) (General Mills' "Versamid 125") | 30 | 20 |
| Ethanol | 70 | 65.7 |
| Solids Content (percent) | 50 | 50 |
| TMP/PAA ratio | 70/30 | 80/20 |
| Cure: | | |
| Time (min.) | 15 | 5 |
| Temp. (°F.) | 275 | 300 |

These compositions were applied to steel panels by the method described in Example 1. The panels were continuously immersed in boiling water for three and one-half months without any sign of softening or blistering. Such a remarkable degree of water resistance is particularly noteworthy in view of the relatively low cure temperatures used.

*Example 5*

Again two compositions were prepared as follows:

| Composition | A | B |
|---|---|---|
| Trimethylolphenol 70% aq. soln | 85.5 | 85.5 |
| Polyaminoamide: | | |
| (a) (General Mills' "Versamid 100") | 15 | |
| (b) (General Mills' "Versamid 125") | | 15 |
| Amine Number | 83–93 | 290–320 |
| Ethanol | 50 | 50 |
| Titanium Dioxide | 75 | 75 | and ground in a ball mill for two hours. After dilution with additional ethanol to a Gardner scale "A" viscosity the compositions were sprayed onto steel panels. The primer coatings were air dried for one hour at room temperatures and then cured for 5 minutes at 300° F. A top coat of a commercial, pigmented alkyl-melamine paint (Jones-Dabney Co.'s Syntex Enamel) was sprayed onto the surface, air dried for one hour and cured 18 minutes at 330° F. The panels were immersed in a 1% aqueous solution of "Tide" detergent for six days at 160° F. At the end of the test, the A panels had no discernible blisters, but the B composition coated panels were badly blistered.

Composition A was less prone to overcure during the separate curing periods, was more impermeable to wetting agents and detergents than the B composition containing a higher amine number polyamide.

It is evident from a consideration of the foregoing that the polyaminoamide-trimethylolphenol compositions of our invention possess a wealth of properties of extreme value in coating substrates of all kinds including wood, metal, synthetic and natural fibers and the like, in bonding wood and other materials, to form tough, flexible, chemically resistant laminates; and also as an adhesive for abrasive and other compositions.

What is claimed is:

1. A heat-reactive composition comprising at least 2 parts by weight of a polyaminoamide per 98 parts by weight of trimethylolphenol.

2. A heat-reactive composition comprising from 2 to 60 parts by weight of a polyaminoamide and from 40 to 98 parts by weight of trimethylolphenol.

3. A heat-reactive composition comprising a polyaminoamide having an amine number of at least 80 and trimethylolphenol in the ratio of 10/90 to 60/40 parts by weight.

4. A heat-reactive composition comprising a polyaminoamide having an amine number above about 200 and trimethylolphenol in the ratio of 10/90 to 60/40 parts by weight.

5. A coating composition curable at low temperatures to a flexible, chemically resistant surface, comprising a homogeneous mixture of a polyaminoamide and trimethylolphenol in the ratio of 10/90 to 60/40 parts by weight.

6. A coating composition curable at low temperatures to a flexible, chemically resistant surface, comprising a homogeneous mixture in a mutual solvent of a polyaminoamide and trimethylolphenol in the ratio of 10/90 to 60/40 parts by weight.

7. A coating composition curable at low temperatures to a flexible, chemically resistant surface, comprising a homogeneous mixture in a low-boiling solvent of a polyaminoamide having an amine number of more than 80 and trimethylolphenol in the ratio of 10/90 to 60/40 parts by weight.

8. A coating composition curable at low temperatures to a flexible, chemically resistant surface, comprising a homogeneous mixture in a low molecular weight alcohol of a polyaminoamide having an amine number greater than 200 and trimethylolphenol in the ratio of 10/90 to 60/40 parts by weight.

9. A tough, flexible, solvent resistant primer coating formed by dissolving in a mutual solvent a polyaminoamide having an amine number above 80 and trimethylolphenol in the ratio of 10/90 to 60/40 parts by weight to form a homogeneous mixture, applying the mixture to a surface and curing.

10. A tough, flexible, solvent resistant coating formed by dissolving in a low molecular weight alcohol a polyaminoamide having an amine number greater than about 200 and trimethylolphenol in the ratio of 10/90 to 60/40 parts by weight to form a homogeneous mixture applying the mixture to a surface and curing.

11. A method for forming a tough, flexible solvent resistant coating which includes the steps of dissolving in a mutual solvent, a polyaminoamide having an amine number greater than about 200 and trimethylolphenol in the ratio of 10/90 to 60/40 parts by weight to form a homogeneous mixture, applying the mixture to a surface, heating the mixture until cured.

References Cited in the file of this patent

UNITED STATES PATENTS

| | | |
|---|---|---|
| 2,579,329 | Martin | Dec. 18, 1951 |
| 2,609,352 | Kvalnes | Sept. 2, 1952 |
| 2,695,908 | Wittcoff et al. | Nov. 30, 1954 |
| 2,811,459 | Wittcoff et al. | Oct. 29, 1957 |